United States Patent [19]

Chen

[11] Patent Number: 5,170,858

[45] Date of Patent: Dec. 15, 1992

[54] AUTOMATIC BRAKING APPARATUS WITH ULTRASONIC DETECTOR

[76] Inventor: Guo-Juh Chen, c/o Hung Hsing Patent Service Center, P.O. Box 55-1670, Taipei (10477), Taiwan

[21] Appl. No.: 719,916

[22] Filed: Jun. 24, 1991

[51] Int. Cl.⁵ .......................... B60T 7/12; B60T 13/20
[52] U.S. Cl. .................................. 180/169; 303/115.2; 303/901
[58] Field of Search .............................. 180/167–169; 303/114 PB, 115 EC, 116 R, 116 SP, DIG. 6; 340/903

[56] References Cited

U.S. PATENT DOCUMENTS

| | | | |
|---|---|---|---|
| 3,689,882 | 9/1972 | Dessailly | 340/903 |
| 3,749,197 | 7/1973 | Deutsch | 180/169 |
| 3,892,483 | 7/1975 | Säufferer | 340/903 X |
| 4,574,908 | 3/1986 | Brick | 180/169 |
| 4,628,317 | 12/1986 | Nishikawa et al. | 340/903 |
| 4,833,469 | 5/1989 | David | 180/169 X |
| 4,846,297 | 7/1989 | Field et al. | 180/169 |
| 4,893,691 | 1/1990 | Park | 180/169 |
| 4,934,477 | 6/1990 | Dai | 180/169 X |
| 4,971,400 | 11/1990 | Jonner | 303/116 R X |
| 5,076,384 | 12/1991 | Wada et al. | 180/169 |

FOREIGN PATENT DOCUMENTS

| | | | |
|---|---|---|---|
| 3442503 | 5/1986 | Fed. Rep. of Germany | 303/115 EC |
| 28057 | 1/1989 | Japan | 303/116 R |

*Primary Examiner*—Douglas C. Butler
*Assistant Examiner*—Alfred Maratori

[57] ABSTRACT

An automatic braking apparatus includes: an ultrasonic wave emitter provided in a front portion of an automatic braking car producing and emitting ultrasonic waves frontwardly in a predetermined distance in front of the car, an ultrasonic receiver also formed in a front portion of the car operatively receiving a reflective ultrasonic wave signal as reflected by another car positioned within the pre-determined distance in front of the automatic braking car for actuating a driving motor to intermittently drive a brake master cylinder to boost brake oil towards two wheel cylinders of front and rear wheels to brake the car intermittently for automatically braking the car for a safe braking purpose.

5 Claims, 4 Drawing Sheets

AUTOMATIC BRAKING APPARATUS WITH ULTRASONIC DETECTOR

BACKGROUND OF THE INVENTION

E. M. Halvajian disclosed a combination impact cushioning bumper in his U.S. Pat. No. 3,472,332 by attaching the impact cushioning bumper and brake device to the front of an automative vehicle having an upper bumper mechanism including a bumper unit which is retractable rearwardly under impact against the yielding resistance of an energy absorbing means, and a lower vertically swingable brake mechanism which is released to swing downwardly into frictional braking contact with the roadway in response to retraction of the bumper unit.

However, this braking mechanism is only actuated upon impact with another car. If the car is running very fast, a serious collision due to a greater moment of inertia and impact force thus produced may still cause breakage or damage of the car or injury to a car driver. Such a conventional brake system can not prevent an impact accident in advance of the occurrence of car collision. In other words, it is too late to brake a car under an impact.

It is therefore expected to disclose an automatic braking system which is actuated in advance of a real collision of two cars.

SUMMARY OF THE INVENTION

The object of the present invention is to provide an automatic braking apparatus including: an ultrasonic wave emitter provided in a front portion of an automatic braking car producing and emitting ultrasonic waves frontwardly in a predetermined distance in front of the car, an ultrasonic receiver also formed in a front portion of the car operatively receiving a reflective ultrasonic wave signal as reflected by another front car positioned within the pre-determined distance in front of the automatic braking car for actuating a driving motor to intermittently drive a brake master cylinder to boost brake oil towards two wheel cylinders of front and rear wheels to brake the car intermittently for automatically braking the car for safe braking purpose.

DETAILED DESCRIPTION

Figure 1:
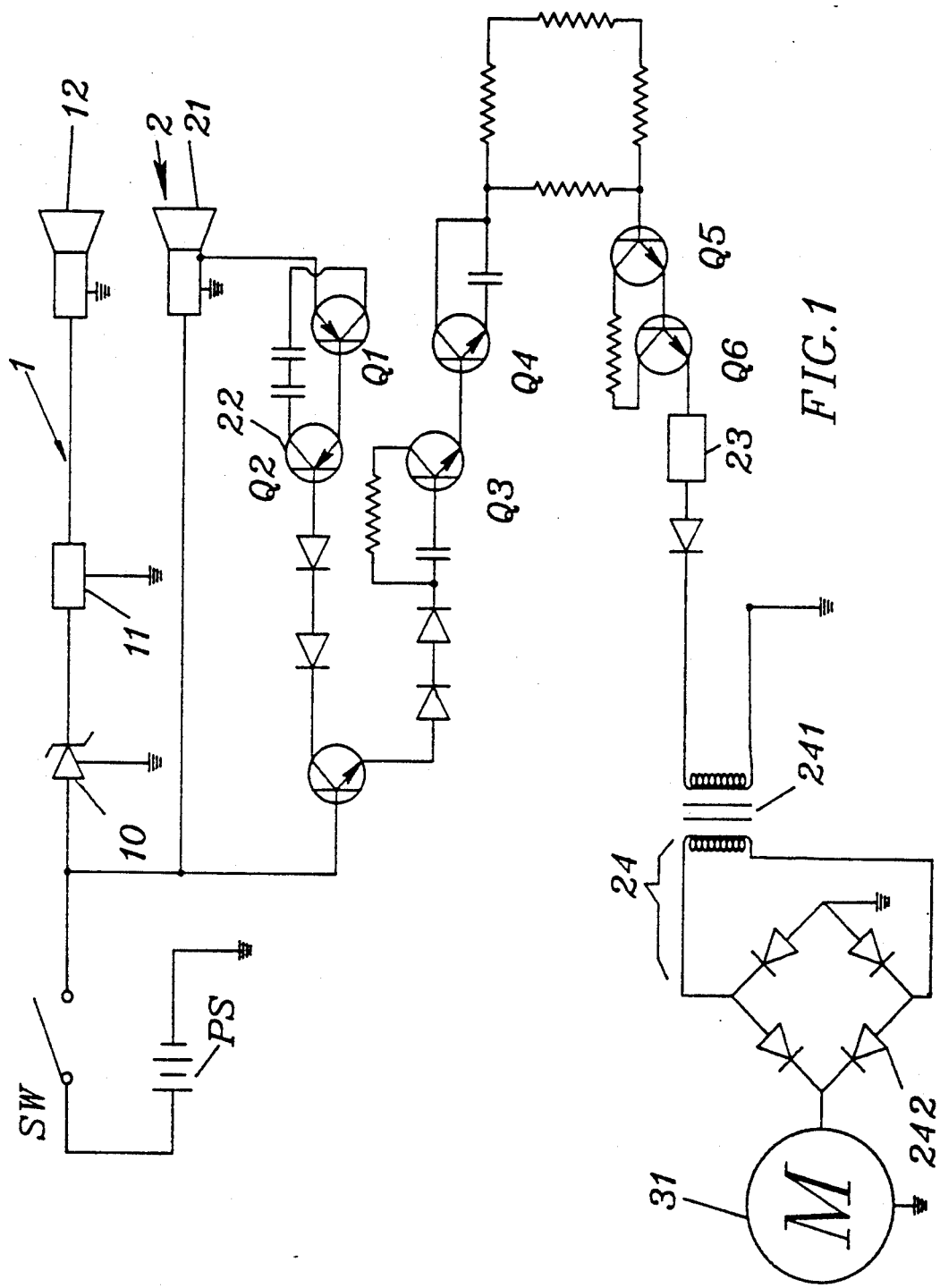
FIG. 1 is a circuit diagram of the present invention.
Figure 2:
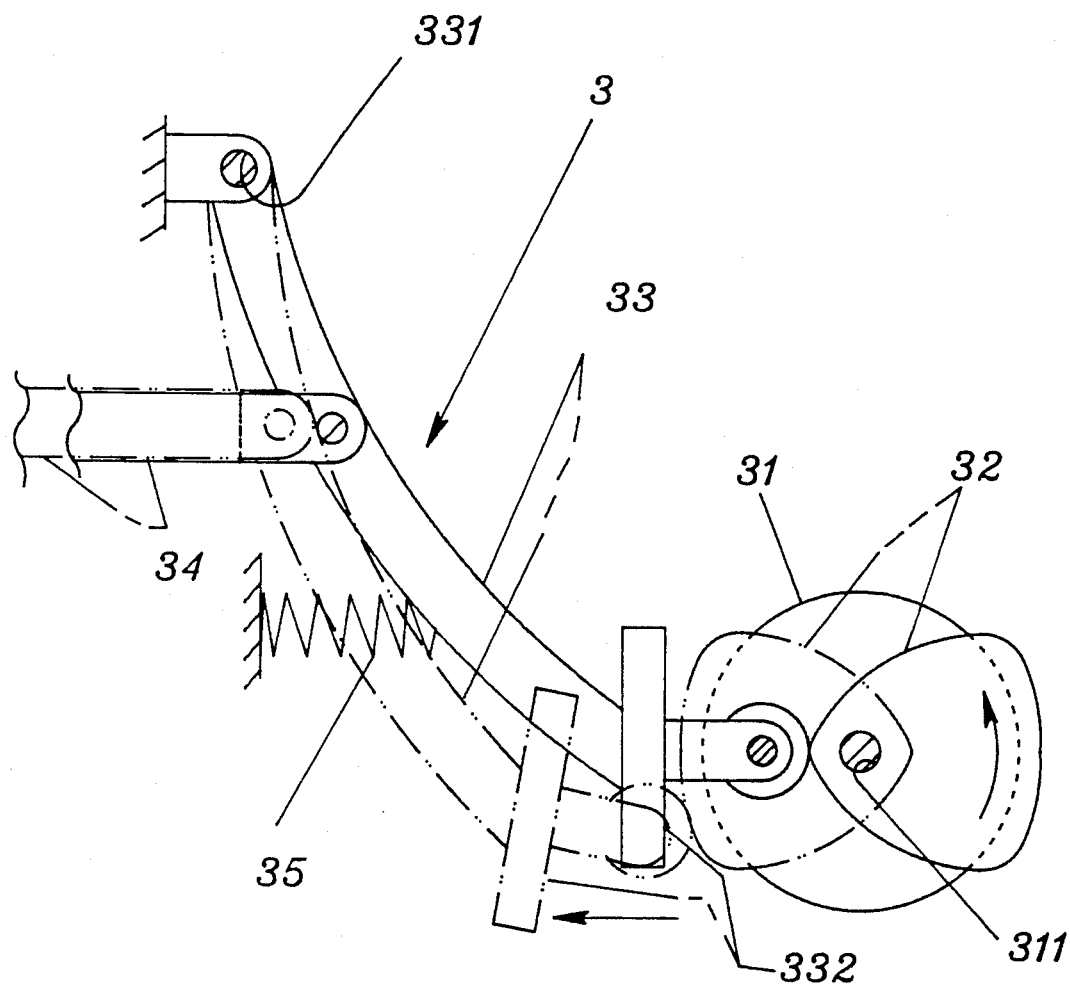
FIG. 2 shows a driving means for an automatic brake system of the present invention.
Figure 3:
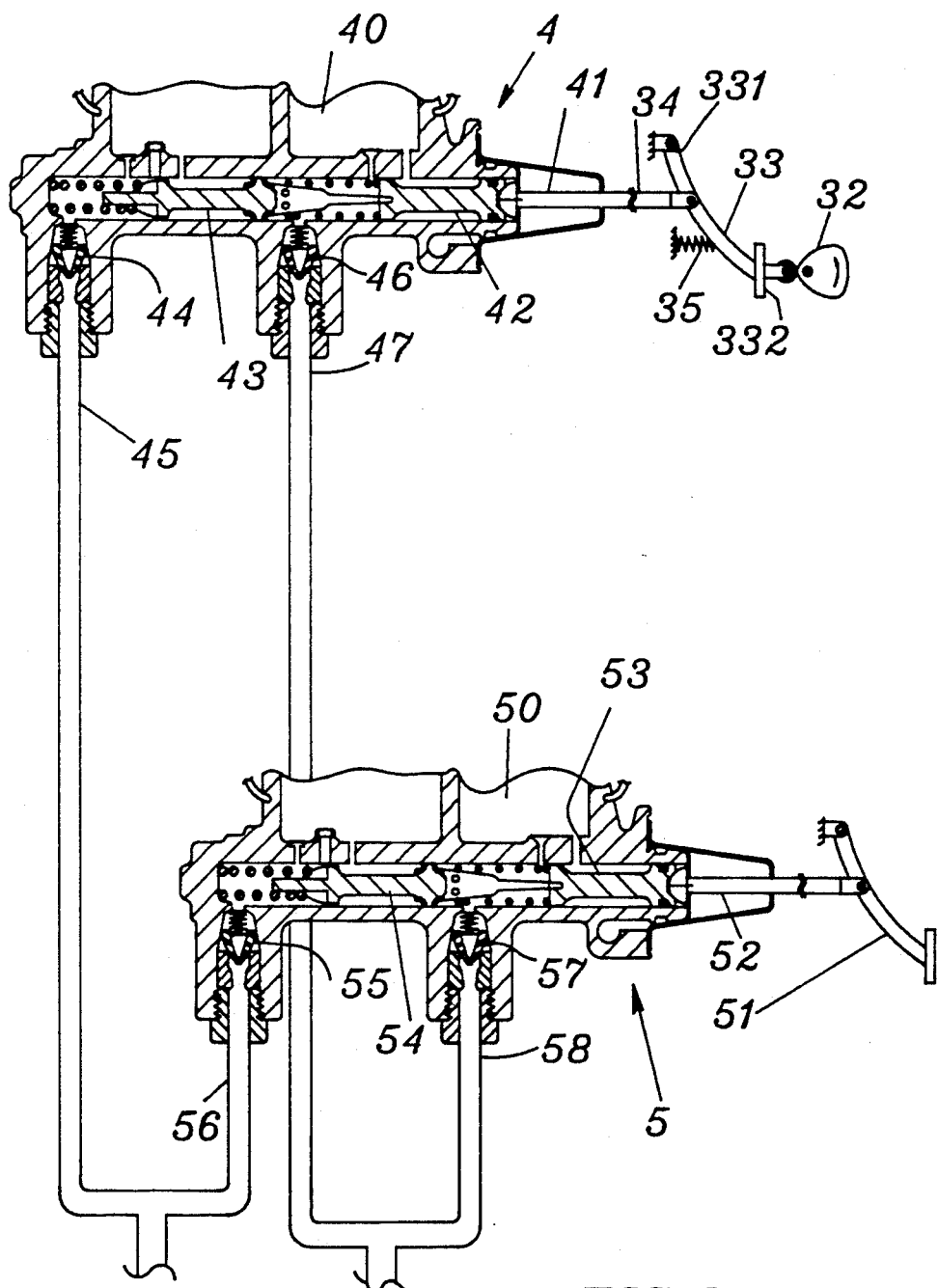
FIG. 3 shows dual (automatic and manual) brake systems in accordance with the present invention.

As shown in FIGS. 1-3, the present invention comprises: an ultrasonic-wave generating circuit 1, an ultrasonic-wave receiving circuit 2, and a driving means 3 for intermittently driving an automatic brake system 4 which is parallelly coupled to a manual brake system 5 mounted in a car.

The ultrasonic-wave generating circuit 1 is formed on a front portion of a car and includes: an oscillator 11 for producing ultrasonic waves electrically connected to a power source PS through a switch SW and a Zener diode 10 for stabilizing input voltage for the circuit 1, and an ultrasonic-wave emitter 12 for emitting ultrasonic wave signal frontwardly in a predetermined distance in front of the car.

The ultrasonic-wave receiving circuit 2 also formed on a front portion of the car includes: an ultrasonic-wave receiver 21 also connected to the power source PS and switch SW operatively receiving a reflective ultrasonic-wave signal reflected from another (a second) car in front of the car (first car) of the present invention, an amplifier circuit 22 comprised of a plurality of transistors Q1, Q2, Q3, Q4, Q5 and Q6 connected in series and connected to the receiver 21 operatively amplifying a wave signal received by the receiver 21, and a relay 23 actuated by the amplifier circuit 22 for outputing power to a transforming and rectifying circuit 24 including a transformer 241 for increasing an output voltage and a bridge rectifier 242 for rectifying and producing direct current for the driving means 3.

The driving means 3 as shown in FIG. 2 includes: a driving motor 31 driven by an output direct current from the transforming and rectifying circuit 24, a cam 32 eccentrically secured to a motor shaft 311 of the driving motor 31, a pedal lever 33 having a fulcrum pivot 331 pivotally secured to a car body and a follower depression portion 332 formed on a lower portion of the lever 33 operatively inwardly depressed by the cam 32, a push rod 34 pivotally secured to an upper portion of the lever 33 under the pivot 331, and a restoring spring 35 normally urging the lever 33 outwardly ready for depression by the cam 32.

The automatic brake system 4 may be a conventional vehicle brake system as shown in FIG. 3 and includes: a brake master cylinder 40, a piston rod 41 connected to the push rod 34 of the driving means 3, a pair of pistons 42, 43 connected in series with the piston rod 41, and a pair of check valves 44, 46 respectively formed on two outlet pipes 45, 47 respectively connected to two wheel cylinders of front and rear wheels (not shown).

The manual brake system 5 includes a brake master cylinder 50, a manual pedal 51 pivotally formed on the car body near a driver's seat in the car, a piston rod 52, a pair of pistons 53, 54 connected with and driven by the piston rod 52, and a pair of check valves 55, 57 respectively formed on two outlet pipes 56, 58 respectively connected to two wheel cylinders of the front and rear wheels (not shown).

The outlet pipes 45, 47 of the automatic brake system 4 are respectively coupled to the two outlet pipes 56, 58 of the manual brake system 5.

When a car of the present invention is driven to approximate another front car within the predetermined distance of the ultrasonic-wave emitter 12 and receiver 21, the ultrasonic-wave signal emitted from the emitter 12 will be transmitted to the front car and then reflected backwardly to be received by the receiver 21. The reflected ultrasonic-wave signal is amplified by the amplifier circuit 22 to actuate the relay 23 to output a voltage which is then transformed by the transformer 241 to increase its voltage value and rectified by the rectifier 242 for starting and running the motor 31.

Upon a rotation of the motor 31, the cam 32 will intermittently depress the follower depression portion 332 of the pedal lever 33 to thereby intermittenly push the push rod 34 and the piston rod 41 inwardly to boost a brake oil from the master cylinder 40 to the wheel cylinders (not shown) for braking the car.

Since the cam 32 intermittently depresses the pedal lever 33, the brake oil as boosted by the pistons 42, 43 is driven intermittently for braking the car for a safe braking purpose.

Other modifications of the driving means 3 of the present invention can be made. For instance, a worm gear engaged with a rack driven by a motor rotated forwardly and reversely may also be used for a rocking operation for intermittently depressing the pedal lever 33 of the present invention. The mechanisms of the driving means 3 for reciprocatively pushing the piston rod are not limited in this invention.

Figure 5:
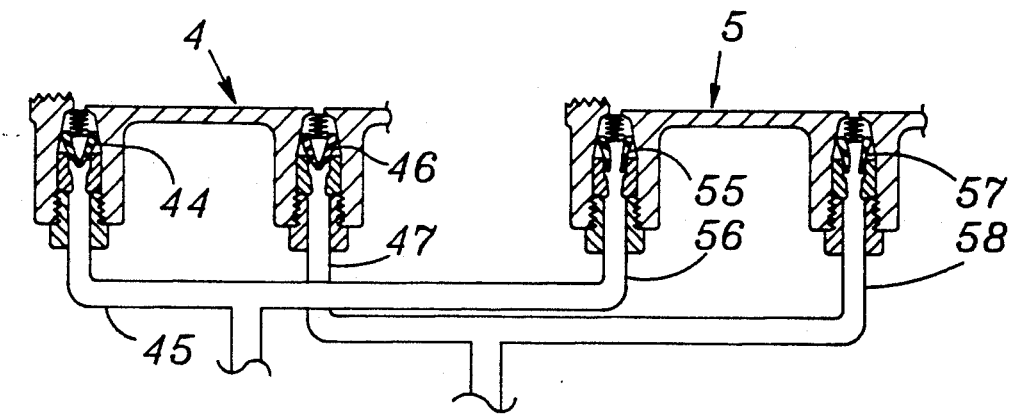
FIG. 5 shows a valve system when operating a manual brake system of the present invention.
Figure 4:
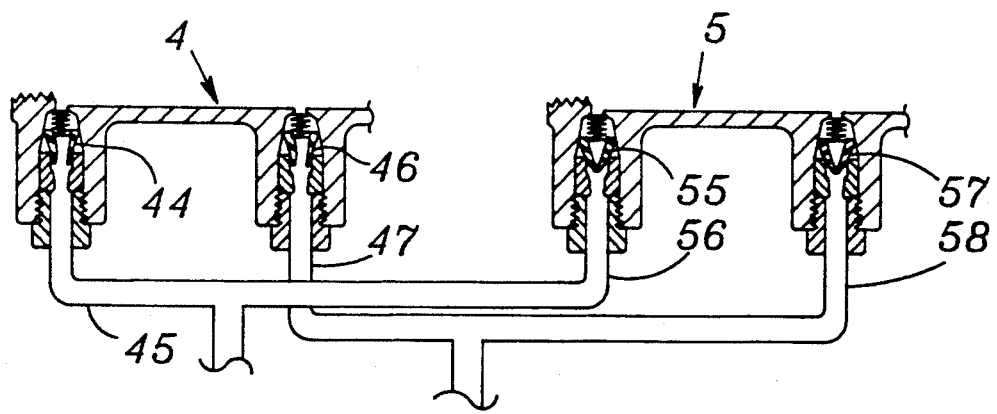
FIG. 4 shows a valve system when operating the automatic brake system of the present invention.

The manual brake system 5 are parallelly coupled to the automatic brake system 4 for ensuring a safely braking operation of a car. When the automatic brake system 4 is operated, the check valves 44, 46 are opened as shown in FIG. 4, whereas the other check valves 55, 57 of the manual system 5 will be closed. FIG. 5 shows the operation of the manual system 5 with respect to a closed automatic system 4.

The brake system 4 or 5 of the present invention is a conventional system, which can be further modified and is not limited in this invention.

Whenever encountering a busy or jammed traffic condition such as in a rush hour in a big city, the switch SW of the automatic brake system 4 of the present invention can be switched off to remain the manual brake system 5 originally mounted in a car to be effectively operated so that a smooth manual operation for braking a car or re-starting operation from a braked condition for running a car can be achieved.

I claim:

1. An automatic braking apparatus comprising:
   an ultrasonic-wave generating circuit including an oscillator and an emitter formed on a front portion of a first car operatively producing an ultrasonic wave signal frontwardly in a predetermined distance in front of the first car;
   an ultrasonic-wave receiving circuit including a receiver receiving a reflected ultrasonic wave signal reflected from a second car in front of the first car within the predetermined distance of said ultrasonic-wave generating circuit, an amplifier circuit operatively amplifying the received reflected signal, a relay actuated by said amplified signal for outputing a voltage, and a transforming and rectifying circuit transforming and increasing the voltage and rectifying a current for outputing a direct current; and
   a driving means driven by said direct current by said transforming and rectifying circuit and operatively intermittenly operating a brake system for braking the first car for automatic braking purpose.

2. An automatic braking apparatus according to claim 1, wherein said driving means includes: a driving motor driven by the direct current from the transforming and rectifying circuit, a cam eccentrically secured to a motor shaft of the driving motor, a pedal lever having a fulcrum pivot pivotally secured to the car body of the first car and a follower depression portion formed on a lower portion of the lever operatively inwardly depressed by the cam, a push rod pivotally secured to an upper portion of the lever under the pivot, and a restoring spring normally urging the lever outwardly ready for depression by the cam.

3. An automatic braking apparatus according to claim 1, wherein said driving means includes a reciprocative means driven by a driving motor actuated by said ultrasonic-wave receiving circuit for reciprocatively driving a pedal lever pivotally secured to the car body of the first car for intermittently operating the brake system of the first car.

4. An automatic braking apparatus according to claim 1, wherein said braking system actuated by said driving means forms an automatic brake system which is parallelly coupled with a manual brake system operatively driven by a pedal pivotally secured to the car body of the first car.

5. An automatic braking apparatus according to claim 4, wherein said automatic and said manual brake system are each provided with at least a check valve in an outlet pipe connected between a brake master cylinder and a wheel cylinder allowing an outward delivery of a brake oil from the master cylinder and precluding a returning flow of the brake oil from said wheel cylinder by said check valve.

* * * * *